US008020009B2

(12) United States Patent
Wertheimer

(10) Patent No.: US 8,020,009 B2
(45) Date of Patent: Sep. 13, 2011

(54) DYNAMIC PERFORMANCE MANAGEMENT OF NETWORK INTERFACE

(75) Inventor: Aviad Wertheimer, Zur-Hadassah (IL)

(73) Assignee: Intel Corporation, Santa Clara, CA (US)

( * ) Notice: Subject to any disclaimer, the term of this patent is extended or adjusted under 35 U.S.C. 154(b) by 1088 days.

(21) Appl. No.: 11/678,183

(22) Filed: Feb. 23, 2007

(65) Prior Publication Data

US 2008/0209020 A1    Aug. 28, 2008

(51) Int. Cl.
G06F 1/32       (2006.01)
H04L 12/00    (2006.01)

(52) U.S. Cl. ........................................ 713/300; 709/227

(58) Field of Classification Search ................... 713/300
See application file for complete search history.

(56) References Cited

U.S. PATENT DOCUMENTS

| 6,219,343 | B1 * | 4/2001 | Honkasalo et al. | 370/335 |
|---|---|---|---|---|
| 6,791,942 | B2 * | 9/2004 | Jin | 370/229 |
| 7,046,966 | B2 * | 5/2006 | Davis | 455/69 |
| 7,177,778 | B2 * | 2/2007 | Gaur et al. | 702/130 |
| 7,346,355 | B2 * | 3/2008 | Wang et al. | 455/452.2 |
| 7,356,014 | B2 * | 4/2008 | Park et al. | 370/338 |
| 7,558,874 | B1 * | 7/2009 | Kodukula et al. | 709/237 |
| 7,562,234 | B2 * | 7/2009 | Conroy et al. | 713/300 |
| 7,603,574 | B1 * | 10/2009 | Gyugyi et al. | 713/300 |
| 7,616,587 | B1 * | 11/2009 | Lo et al. | 370/254 |
| 7,653,408 | B1 * | 1/2010 | Kopikare et al. | 455/522 |

* cited by examiner

*Primary Examiner* — Thomas Lee
*Assistant Examiner* — Eric Chang
(74) *Attorney, Agent, or Firm* — Blakely, Sokoloff, Taylor & Zafman LLP

(57) ABSTRACT

A dynamic power management technique to optimize the performance to a pre-defined power or temperature limit. A computing system may comprise a performance management unit that may reconfigure the performance parameters, dynamically, based on the pre-defined power or temperature limit. Such an approach may provide performance enhancements as the power consumed by various components of the computing system may be reduced.

13 Claims, 2 Drawing Sheets

DYNAMIC PERFORMANCE MANAGEMENT OF NETWORK INTERFACE

BACKGROUND

A computer system such as a client and a network device may operate with a limited power budget. As performance requirements increase the heat dissipated by these devices also increase. Static power management techniques may comprise placing the computer system in a 'sleep' or 'suspend' mode while the computer system is inactive for a pre-determined time. Also, some dynamic power management may enable the computer system to operate at a reduced power with reduced performance. Dynamic power management techniques may comprise, for example, frequency scaling and power supply scaling.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes a dynamic performance management technique. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, and digital signals). Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Figure 1:
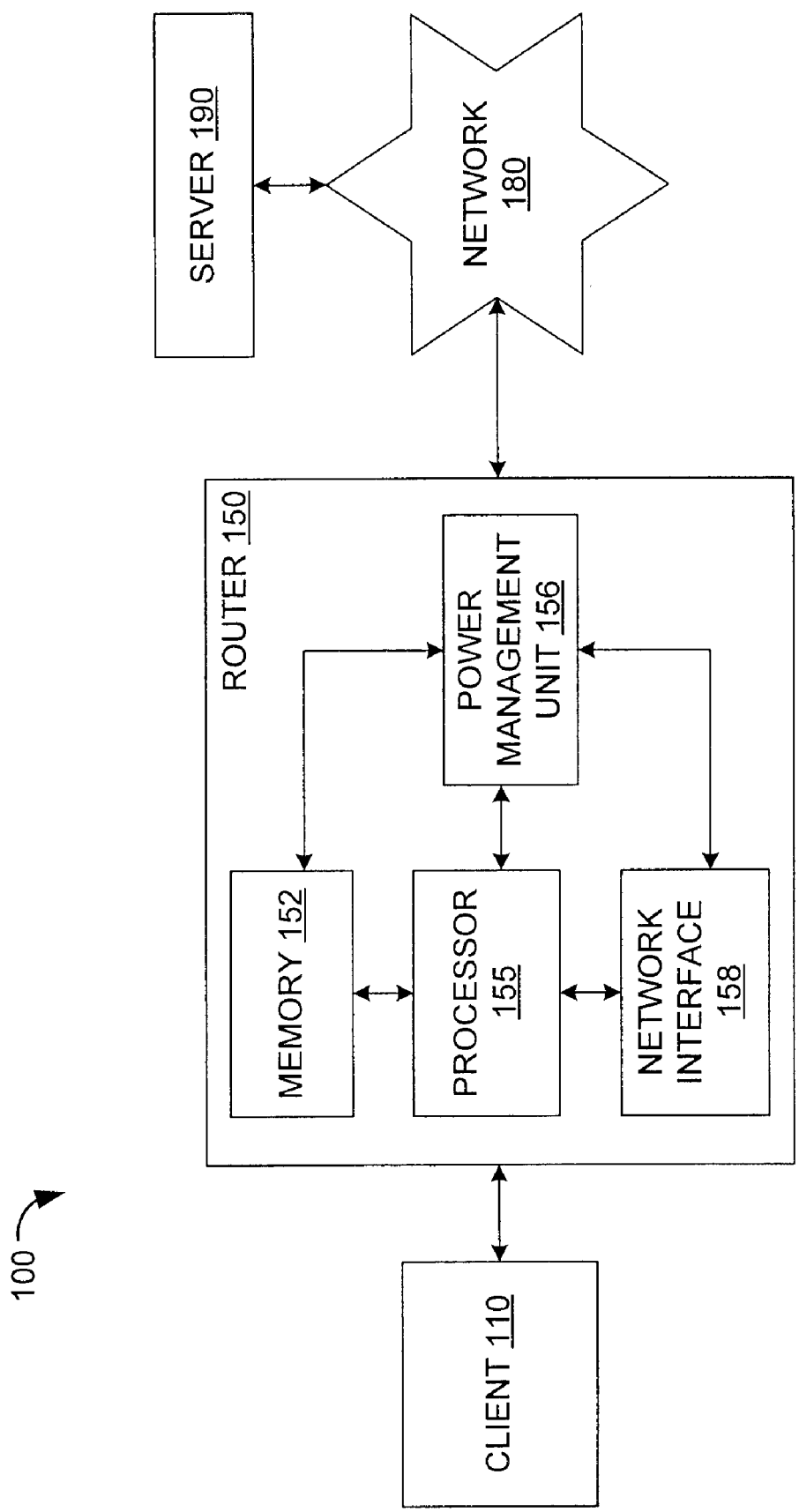
FIG. 1 illustrates an embodiment of a computing system 100.

An embodiment of a network environment 100 is illustrated in FIG. 1. The network environment 100 may comprise a client 110, a router 150, a network 180, and a server 190. In one embodiment, the client 110, the router 150, and the server 190 may support dynamic performance management techniques to optimize the performance of the components of a computer system for a pre-determined power or temperature limit.

The server 190 may generate a response after receiving a request from the client 110. The server 190 may send the response to the client 110 via the network 180 and the router 150. The server 190 may comprise, for example, a web server, a transaction server, or a database server.

The network 180 may comprise one or more network devices such as a switch or a router, which may process and send the packets to an appropriate network device provisioned in a path to the destination system. The network 180 may enable transfer of messages between the client 110 and the server 190. The network devices of the network 180 may be configured to support various protocols such as TCP/IP.

The client 110 may comprise a desktop computer system, a laptop computer system, a personal digital assistant, a mobile phone, or any such computing system. In one embodiment, the client 110 may couple to the router 150. In one embodiment, the client 110 may support dynamic performance management techniques to optimize the performance of various components of the client 110 for a pre-determined power or temperature limit. The client 110 may be coupled to a link partner such as the router 150 via a local area network (LAN). In one embodiment, the client 110 may support hyper text transfer protocol (HTTP), file transfer protocols (FTP), and TCP/IP, and similar other protocols.

The router 150 may enable transfer of packets between the client 110 and the server 190 via the network 180. The router 150 may be coupled to a link partner such as the client 110 via a local area network (LAN). In one embodiment, the router 150 may comprise a memory 152, a processor 155, a performance management unit 156, and a network interface 158.

In one embodiment, the network interface 158 may receive the packets from the processor 155 and performance parameters from the performance management unit 156. In one embodiment, the network interface 156 may forward the packets based on the performance parameters provided by the performance management unit 156. In one embodiment, the network interface 158 may transfer the data at a rate determined by the performance parameters.

In one embodiment, the processor 155 may generate a 'manage signal' that may initiate the performance management unit 156 to determine the actual power consumed by the components of the router 150. In one embodiment, the processor 155 may generate the 'manage signal' at pre-determined intervals of time.

In one embodiment, the performance management unit 156 may determine the reconfiguration values of the performance parameters. In one embodiment, the performance management unit 156 may determine the reconfigured performance values in response to receiving the mange signal at pre-determined intervals of time. In one embodiment, the performance management unit 156 may store the actual power consumption values in the memory 152. In one embodiment, the performance management unit 158 may comprise power or thermal sensors to detect the actual power consumed or the heat dissipated.

In one embodiment, the performance management unit 156 may determine the reconfigured performance parameters as a function of the pre-defined power or temperature limits. In one embodiment, the performance management unit 156 may support dynamic performance management techniques to optimize the performance of the components of the router 150 for a pre-determined power or temperature limit.

In one embodiment, determination of the performance parameters at pre-defined intervals of time may allow the performance parameters to be re-configured dynamically. In one embodiment, the performance management unit 156 may determine the reconfigured performance parameters and may provide the re-configured performance parameters to the network interface 158. In one embodiment, the dynamic reconfiguration of the performance parameters of a first device based on the pre-defined power or temperature limit may provide performance enhancements. In one embodiment, the performance parameters of the first device may be determined based on the power consumption of the other devices in the router 150. Such an approach may provide opportunistic performance enhancements in the first device while the other devices are operating at low power.

Figure 2:
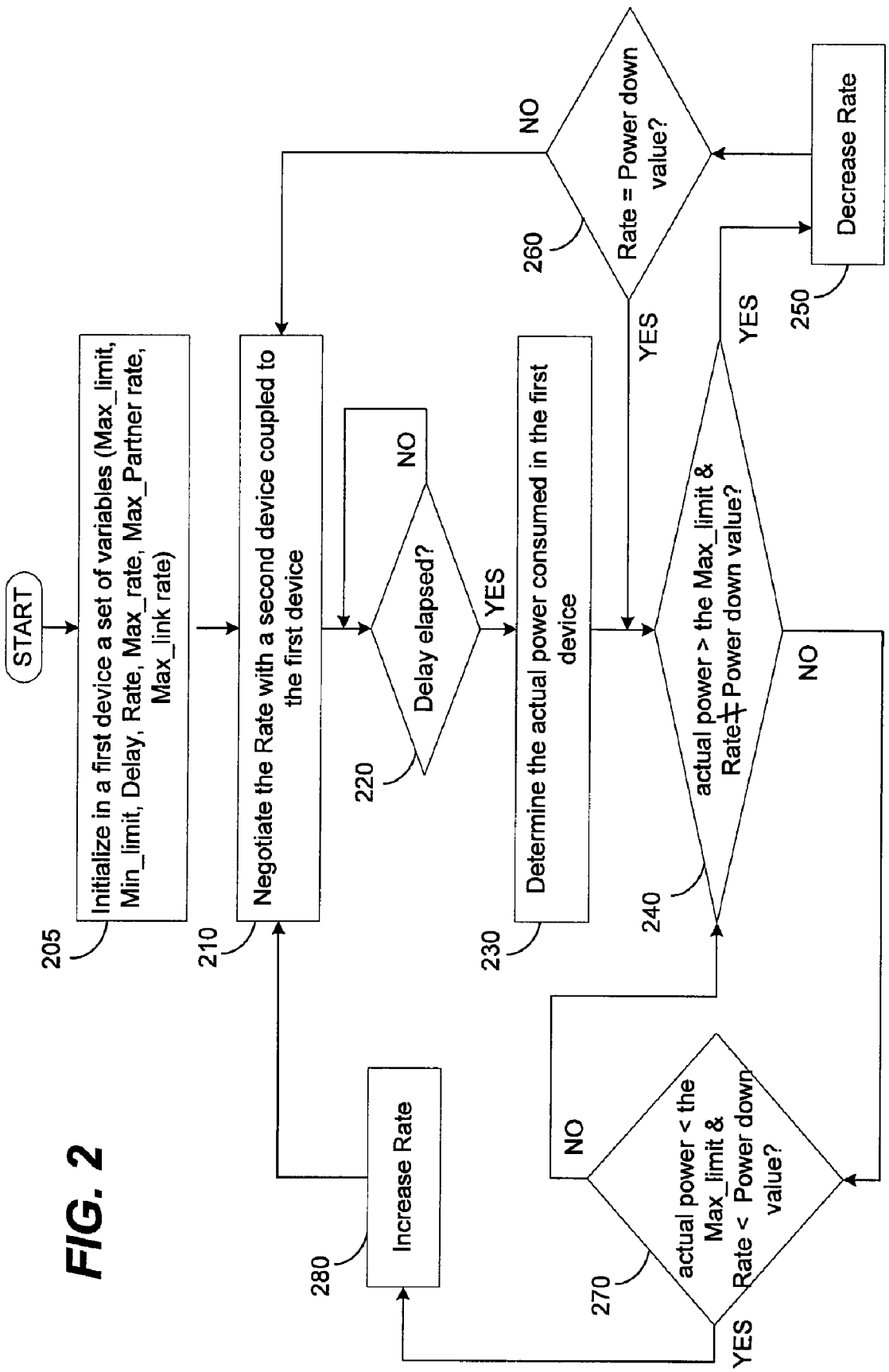
FIG. 2 illustrates an embodiment of the computing system 100 supporting dynamic network re-configuration to meet a pre-defined power or temperature limit.

An embodiment of the router 150 supporting dynamic performance management to optimize its performance for a pre-determined power or temperature limit is described in FIG. 2. Also, in one embodiment, the dynamic performance management technique is described with reference to configuring network parameters such as data transfer rate based on the pre-defined power limit. However, such dynamic power management techniques may also be used in other scenarios such as management of processor activity.

In block 205, a first device may initialize a set of variables after power-on. In one embodiment, the router 150 may initialize a set of variables and the set of variables may comprise Max_limit, Min_limit, Delay, Rate, Max_Rate, Max_Partner Rate, and Max_link Rate. In one embodiment, the Max_limit and Min_limit may define the power or thermal limit. In one embodiment, the Max_limit and Min_limit may implement a hysterisis to avoid link rate fluctuations which may impact network performance.

In one embodiment, the Max_limit variable may equal the maximum pre-defined power or temperature limit value. If the actual power consumption value is above the Max-limit, the network performance may decrease. In one embodiment, the Min_limit variable may equal minimum pre-defined power or temperature limit value. In one embodiment, if the actual power consumption value is below the Min_limit, the network performance may increase. In one embodiment, the Max_limit and the Min_limit may, respectively, equal 10 Wafts and 1 watt.

In one embodiment, the Delay variable may refer to a time period that the router 150 may wait after completion of auto-negotiation with the client 110. Introducing such delay may enable the router 150 or the client 110 to stabilize the power consumed by its components before measuring the power values.

In one embodiment, the Rate variable may refer to data rate that may be negotiated between the link partners (the router 150 and the client 110) based on the order listed below:

(1) Power Down; (2) 10M/Sec Half Duplex; (3) 10M/Sec Full Duplex; (4) 100M/Sec Half Duplex; (5) 100M/sec Full Duplex; (6) 1 G/Sec Half Duplex; (7) 1G/Sec Full Duplex; (8) 10 G/sec Full Duplex (Full reach or reduced reach depending on cable quality).

In one embodiment, the Rate of data transfer in the above list depicts lowest data rate to highest data rate. In one embodiment, the lowest data rate may be associated with lowest power consumption and highest data rate may be associated with maximum power consumption. After initialization, the Rate value may be set to the highest value supported by the router 150 (e.g. 10 G/sec). In one embodiment, the Max_Rate may refer to a maximum link rate supported by the router 150. In one embodiment, the Max_Rate supported by the router 150 may equal 10 G/sec.

In one embodiment, the Max_Partner_Rate may refer to a maximum Link rate supported by the link partner, the client 110. In one embodiment, the Max_Partner_Rate may be initialized to Max_Rate value and updated each time a negotiation is completed successfully between the link partners, the router 150 and the client 110. In one embodiment, the Max_Partner_Rate may equal 10 G/Sec during initialization. However, after negotiation the Max_Partner_Rate may equal 1 GB/Sec as the maximum data rate supported by the client 110 may equal 1 GB/Sec.

In one embodiment, the Max_link_Rate may equal the lowest common denominator between the Max_Rate and the Max_Partner_Rate. In one embodiment, the Max_link_Rate may hold the maximum rate supported on the link. At the initialization, the Max_link_Rate may equal the Max_Rate.

In block 210, the first device such as the router 150 may negotiate the Rate with a second device such as the client 110, which may be coupled to the router 150. In one embodiment, the router 150 may negotiate the data rate and other operating parameters with the link partner, the client 110 using the Rate value supported by the router 150. In one embodiment, the router 150 may update the Rate value based on the resulting value after the negotiation. In one embodiment, the router 150 may update the Max_Partner_Rate with the data rate supported by the client 110 and the Max_link_Rate may be assigned a value equaling the lowest common denominator of the Max_Partner_Rate and Max_Rate.

In block 220, the router 150 may wait for a period equal to Delay and control passes to block 230 if the Delay is elapsed and loops back to block 210 to determine if Delay has elapsed.

In block 230, the router 150 may determine the actual power consumed. In one embodiment, the processor 155 may compute the actual power consumed by the components of the router 150 and may store such values in pre-specified memory locations. In one embodiment, a component supported by the network interface 158 may retrieve the values stored in the pre-specified memory locations.

In block 240, the router 150 may check if the actual power is greater than the Max_limit and Rate not equal to a rate at the power down state and control passes to bock 250 if the both the actual power is greater than the Max_limit and the Rate is not equal to power down and to block 270 otherwise.

In block 250, the router may decrease the Rate. In one embodiment, if the actual power consumed is greater than the Max_limit, the actual power consumed may be higher than the Max_limit and as a result of operating at higher power levels, the temperature levels may increase. Increase in the temperature levels above a pre-specified temperature limit may decrease the performance of electronic components. As a result, the network performance may decrease and the decrease in the Rate may in turn decrease the actual power consumed and the temperature levels.

In block 260, the router 150 may check if the Rate equals power down and control passes to block 240 if the Rate equals power down and to block 210 otherwise.

In block 270, the router 150 may determine whether the actual power is less than the Max_limit and Rate is less than power down value. Control passes to block 280 if the condition is true and to block 240 otherwise.

In block 280, the router 150 may increase the Rate as the actual power consumed is less than the Max_limit and the Rate is less than the power down value. Thereafter, control passes to block 210.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A first device comprising:
a processor,
a network interface coupled to the processor, and
a performance management unit coupled to the processor and the network interface,
wherein the performance management unit is to set a data transfer rate of the network interface to a maximum rate that is supported by the first device while initializing the first device,
wherein the performance management unit is to negotiate the data transfer rate with a second device coupled to the first device over a link,
wherein the performance management unit is to compare, after a delay time has elapsed after negotiating the data transfer rate, an actual power consumed by the network interface with a maximum power limit for the network interface,
wherein the performance management unit is to dynamically reconfigure performance parameters of the network interface to change the data transfer rate to a maximum link rate based both on the negotiation of the data transfer rate with the second device and comparison of the actual power consumed by the network interface with the maximum power limit, and
wherein the performance management unit is to enable the network interface to transmit data at the maximum link rate.

2. The first device of claim 1, wherein the performance management unit is to reconfigure the performance parameters to decrease the data transfer rate supported by the network interface if the actual power consumed by the network interface is greater than the maximum power limit.

3. The first device of claim 2, wherein the performance management unit is to reconfigure the performance parameters to increase the data transfer rate supported by the network interface if the actual power consumed by the network interface is less than the minimum power limit.

4. The first device of claim 1, wherein the maximum link rate is determined based on a data transfer rate supported by the first device and a second device coupled to the first device, wherein the maximum link rate is equal to or less than the maximum data transfer rate supported by the first device.

5. The first device of claim 4, wherein the network interface is to transfer a plurality of packets over the link to the second device at the data transfer rate determined by the performance management unit.

6. The first device of claim 5, wherein the first device is a router and the second device is a client.

7. The first device of claim 4, wherein the performance management unit is to set the maximum link rate to a lowest data transfer rate of data transfer rates supported by the first device and the second device.

8. A method in a first device, comprising:
determining initial values of a plurality of performance parameters,
setting data transfer rate to a maximum rate that is supported by the first device while initializing the first device,
negotiating the data transfer rate with a second device coupled to the first device over a link,
comparing, after a delay time has elapsed after negotiating the data transfer rate, an actual power consumed by a network interface of the first device with a maximum power limit defined by the initial values for the network interface,
dynamically reconfiguring performance parameters of the network interface to change the data transfer rate to a maximum link rate based both on the negotiation of the data transfer rate with the second device and comparing the actual power consumed by the network interface with the maximum power limit, and
enabling the network interface to transfer data at a rate based on the maximum link rate.

9. The method of claim 8, wherein reconfiguring of the plurality of performance parameters is to decrease the maximum link rate if the actual power consumed by the network interface is more than the maximum power limit.

10. The method of claim 9, wherein reconfiguring the plurality of performance parameters is to increase the maximum link rate if the actual power consumed by the network interface is less than the minimum power limit.

11. The method of claim 10, wherein increasing the maximum link rate causes the network interface to increase a rate at which data is transferred by the network interface over the link to the second device wherein the maximum link rate is equal to or less than the maximum data transfer rate supported by the first device.

12. The method of claim 9, wherein decreasing the maximum link rate causes the network interface to decrease a rate at which data is transferred by the network interface over the link to the second device.

13. The method of claim 8 further comprises setting the maximum link rate to a lowest data transfer rate of data transfer rates supported by the first device and the second device coupled to the first device over the link.

* * * * *